US009577919B2

(12) United States Patent
Christian et al.

(10) Patent No.: US 9,577,919 B2
(45) Date of Patent: *Feb. 21, 2017

(54) DNS WILDCARD BEACONING (71) Applicant: Yahoo! Inc., Sunnyvale, CA (US)

(72) Inventors: Michael Christian, Pacifica, CA (US); David Apgar, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/191,807

(22) Filed: Feb. 27, 2014

(65) Prior Publication Data

US 2014/0181287 A1   Jun. 26, 2014

Related U.S. Application Data (63) Continuation of application No. 11/962,051, filed on Dec. 20, 2007, now Pat. No. 8,756,340.

(51) Int. Cl.
*H04L 12/741* (2013.01)
*H04L 29/08* (2006.01)
(Continued)

(52) U.S. Cl.
CPC ......... *H04L 45/22* (2013.01); *H04L 29/12066* (2013.01); *H04L 45/745* (2013.01);
(Continued)

(58) Field of Classification Search
CPC ................................................... H04L 45/745
See application file for complete search history.

(56) References Cited

U.S. PATENT DOCUMENTS 6,003,030 A    12/1999  Kenner et al.
6,119,234 A *   9/2000  Aziz ...................... H04L 29/06
                                                          726/11
(Continued)

FOREIGN PATENT DOCUMENTS

JP          10-257455 A    9/1998
KR    10-2005-0055305 A    6/2005
(Continued)

OTHER PUBLICATIONS

IP Australia, "Patent Examination Report No. 1" in Application No. 2012202910, dated Mar. 26, 2014, 3 pages.
(Continued)

*Primary Examiner* — Patrice Winder
*Assistant Examiner* — Angela Widhalm de Rodriguez
(74) *Attorney, Agent, or Firm* — Hickman Palermo Becker Bingham LLP; Edward A. Becker (57) ABSTRACT DNS wildcard beaconing. In one embodiment, for example, a computer-implemented method comprises: receiving a network request from a resolver to resolve a hostname, the network request from the resolver comprising a network address of the resolver, the hostname comprising a unique wildcard portion; storing first data representing an association between at least the unique wildcard portion and the network address of the resolver; receiving a network request from a client for a resource, the network request from the client comprising a network address of the client and at least the unique wildcard portion; storing second data representing an association between at least the unique wildcard portion and the network address of the client; based on the first data and the second data, associating the client with the resolver; and storing third data representing the association between the client and the resolver.

29 Claims, 4 Drawing Sheets (51) Int. Cl.
*H04L 29/12* (2006.01)
*H04L 12/707* (2013.01)

(52) U.S. Cl.
CPC ...... *H04L 61/1511* (2013.01); *H04L 67/1002* (2013.01); *H04L 67/1008* (2013.01); *H04L 67/1036* (2013.01)

(56) References Cited

U.S. PATENT DOCUMENTS

| | | | |
|---|---|---|---|
| 6,665,702 | B1 | 12/2003 | Zisapel et al. |
| 6,725,214 | B2* | 4/2004 | Garcia-Chiesa |
| 6,728,232 | B2 | 4/2004 | Hasty et al. |
| 7,007,089 | B2 | 2/2006 | Freedman |
| 7,139,840 | B1 | 11/2006 | O'Toole |
| 7,159,034 | B1 | 1/2007 | Rai |
| 7,159,183 | B1* | 1/2007 | Kudukoli ............. G06F 8/34 715/762 |
| 7,240,100 | B1* | 7/2007 | Wein et al. ............. 709/214 |
| 7,296,155 | B1 | 11/2007 | Trostle et al. |
| 7,478,148 | B2* | 1/2009 | Neerdaels ............. H04L 29/06 709/223 |
| 7,512,702 | B1 | 3/2009 | Srivastava et al. |
| 7,552,233 | B2 | 6/2009 | Raju et al. |
| 7,644,163 | B2* | 1/2010 | Gustafsson ............. H04L 29/06 370/337 |
| 7,653,700 | B1* | 1/2010 | Bahl et al. ............. 709/217 |
| 7,711,853 | B2* | 5/2010 | Horton ............. H04L 29/1215 709/203 |
| 7,734,745 | B2* | 6/2010 | Gloe ............. H04L 29/12066 709/223 |
| 7,774,432 | B2* | 8/2010 | Cartmell ............. G06F 17/30887 709/219 |
| 7,792,994 | B1 | 9/2010 | Hernacki |
| 7,934,011 | B2 | 4/2011 | Gavin et al. |
| 8,224,994 | B1* | 7/2012 | Schneider ............. 709/245 |
| 8,510,411 | B2 | 8/2013 | Coulson et al. |
| 8,578,166 | B2* | 11/2013 | De Monseignat .. H04L 63/0823 713/175 |
| 2002/0038360 | A1 | 3/2002 | Andrews et al. |
| 2002/0059622 | A1 | 5/2002 | Grove et al. |
| 2002/0127993 | A1 | 9/2002 | Zappala |
| 2002/0138649 | A1* | 9/2002 | Cartmell ............. H04L 29/06 709/245 |
| 2002/0152309 | A1 | 10/2002 | Gupta et al. |
| 2003/0002484 | A1 | 1/2003 | Freedman |
| 2003/0023712 | A1 | 1/2003 | Zhao et al. |
| 2003/0046383 | A1 | 3/2003 | Lee et al. |
| 2003/0072270 | A1 | 4/2003 | Guerin et al. |
| 2003/0079027 | A1 | 4/2003 | Slocombe et al. |
| 2003/0099203 | A1 | 5/2003 | Rajan et al. |
| 2003/0133410 | A1 | 7/2003 | Kang et al. |
| 2003/0149690 | A1* | 8/2003 | Kudlacik ............. G06F 17/30864 |
| 2004/0044791 | A1* | 3/2004 | Pouzzner ............. 709/245 |
| 2004/0139170 | A1 | 7/2004 | Shen et al. |
| 2004/0203897 | A1 | 10/2004 | Rogers |
| 2005/0010653 | A1 | 1/2005 | McCanne |
| 2005/0188073 | A1 | 8/2005 | Nakamichi et al. |
| 2006/0047786 | A1 | 3/2006 | Doi |
| 2006/0112176 | A1* | 5/2006 | Liu et al. ............. 709/223 |
| 2006/0123340 | A1* | 6/2006 | Bailey et al. ............. 715/700 |
| 2006/0193252 | A1 | 8/2006 | Naseh et al. |
| 2006/0235972 | A1 | 10/2006 | Asnis |
| 2006/0271700 | A1 | 11/2006 | Kawai et al. |
| 2007/0036146 | A1 | 2/2007 | Adkins et al. |
| 2007/0060102 | A1 | 3/2007 | Immonen et al. |
| 2007/0121596 | A1 | 5/2007 | Kurapati |
| 2008/0052387 | A1 | 2/2008 | Heinz et al. |
| 2008/0052393 | A1 | 2/2008 | McNaughton et al. |
| 2008/0052394 | A1 | 2/2008 | Bugenhagen et al. |
| 2008/0052401 | A1 | 2/2008 | Bugenhagen et al. |
| 2008/0167886 | A1 | 7/2008 | Marcken |
| 2009/0100128 | A1 | 4/2009 | Czechowski et al. |
| 2009/0164646 | A1 | 6/2009 | Christian et al. |
| 2009/0245114 | A1 | 10/2009 | Vijayaraghavan |
| 2012/0099433 | A1 | 4/2012 | Willars et al. |
| 2013/0254425 | A1 | 9/2013 | Broerman et al. |

FOREIGN PATENT DOCUMENTS

| | | |
|---|---|---|
| WO | WO03/084159 | 10/2003 |
| WO | WO 2004/079551 | 9/2004 |
| WO | WO2007/001704 | 4/2007 |

OTHER PUBLICATIONS

Current Claims in Australia application No. 2012202910, dated Mar. 2014, 5 pages.
Notice of Preliminary Rejection from Korean foreign patent application No. 102010-7016192 (with English translation), Applicant: Yahoo! Inc., dated Jul. 15, 2011, 4 pages.
Current claims in Korean patent application No. 10-2010-7016192, Applicant: Yahoo! Inc., 4 pages, dated Jul. 2011.
Current claims in AU patent application No. 2009257992, Applicant: Yahoo! Inc, dated May 2011, 4 pages.
Chinese Office Action received in Application 200880121846.3 dated Oct. 19, 2011 (6 pgs.).
Chinese Current Claims in Application 200880121846.3 dated Oct. 19, 2011 (4 pgs.).
Australian Patent Office, AU Examiner's Report received in International Application No. 2009257992 dated Oct. 28, 2011 (2 pages).
Current Claims, Application No. 2009257992 (3 pages).
Chinese Office Action received in Application No. 200880120972.7 dated Aug. 20, 2012 (10 pages).
Current Claims in application No. 200880120972.7, dated Aug. 2012 (4 pages).
Chinese Current Claims in Application 200880121846.3 dated Jun. 18, 2013 (4 pages).
PCT Office, Written Opinion of the International Searching Authority and International Search Report, PCT/US2008/086700; Mailing date: Jun. 25, 2009, 7 pages.
Current pending claims for PCT Application No. PCT/US2008/086700, 4 pages.
PCT Office, Written Opinion of the International Searching Authority and International Search Report, PCT Application No. PCT/US2008/086704, Mailing date: Jun. 16, 2009, 7 pages.
Current pending claims for PCT Application No. PCT/US2008/086704, 4 pages.
PCT Office, Written Opinion of the International Searching Authority and International Search Report, PCT/US2008/088158; Mailing date: Jul. 8, 2009, 9 pages.
Current pending claims for PCT Application No. PCT/US2008/088158, 4 pages.
Office Action, CN Application No. 200880120972.7, dated Aug. 26, 2013, 10 pages.
Claims from CN Application No. 200880120972.7, dated Aug. 2013, 4 pages.
The Patent Office of the People's Republic of China, "Rejection Decision" in application No. 200880120972.7, dated Jan. 21, 2014, 11 pages.
Current Claims in application No. 200880120972.7, dated Jan. 2014, 4 pages.
Chinese Current Claims in Application 200880121846.3 dated Dec. 31, 2011 (4 pages).
Taiwanese Current Claims, Application No. 97141811, dated Apr. 2012 (4 pages).
Chinese Current Claims, Application No. 200980110431.0 dated May 2012 (4 pages).
PCT Office, Written Opinion of the International Searching Authority and International Search Report, PCT/US2009/038969; Mailing date: Dec. 23, 2009, 11 pages.
Current pending claims for PCT Application No. PCT/ US2009/038969, 4 pages.
Singapore Patent Office, Examination Report received in International Application No. 201006571-2 dated Apr. 18, 2011 (5 pages).

(56) References Cited

OTHER PUBLICATIONS

Kipo's Notice of Preliminary Rejection in application No. 10-2010-7016801, dated Feb. 1, 2012, 6 pages.
Japanese Patent Office, JP Office Action received in International Application No. 2011-502141 dated Jan. 10, 2012, English Translation (3 pages).
Current Claims, Application No. 2011-502141 (4 pages).
Japanese Office Action received in Application No. 2010-539662 dated Apr. 5, 2012 (2 pages).
Current Claims in Japanese Application No. 2010-539662 dated Apr. 2012 (4 pages).
Taiwanese Office Action received in Application No. 97141816 dated Feb. 24, 2012 (4 pages).
Current Claims in Taiwanese Application No. 97141816 dated Feb. 2012 (4 pages).
Japanese Patent Office, JP Office Action received in International Application No. 2010-539661 dated Apr. 5, 2012 (5 pages).
Current Claims, Application No. 2010-539661, dated Apr. 2012, (4 pages).
Australian Patent Office, AU Examiner's Report No. 3 received in International Application No. 2009257992 dated Apr. 10, 2012 (2 pages).
Current Claims, Application No. 2009257992, dated Apr. 2012. (7 pages).
Taiwan Patent Office, TW Office Action received in International Application No. 97141811 dated Apr. 11, 2012 (3 pages) with English Translation (3 pages).
Chinese Patent Office, CN Office Action received in International Application No. 200980110431.0 dated May 16, 2012 with translation (27 pages).
Japan Patent Office, "Office Action", in application No. 2010-524172, dated Jul. 5, 2012, 4 pages.
Current Claims in application No. 2010-524172, dated Jul. 2012, 3 pages.
The Patent Office of the People's Republic of China, "The Second Office Action", in application No. 200880121846.3, dated Jul. 5, 2012, 11 pages.
Current Claims in application No. 200880121846.3, dated Jul. 2012, 4 pages.
Translation of Office Action in Taiwan Application No. 098105230, dated Oct. 4, 2012, 6 pages.
Current claims in application No. 098105230, dated Oct. 2012, 4 pages.
Invention Patent Decision of the Intellectual Property Office of the Ministry of Economic Affairs, Notice of Allowance in application No. 97141811, dated Sep. 18, 2012, 3 pages.
Current Claims in application No. 97141811 dated Sep. 2012, 5 pages.
State Intellectual Property Office of the People's Republic of China, "Third Office Action", in application No. 200880121846.3, dated Nov. 5, 2012, 7 pages.
Current Claims in Chinese Patent Application No. 200880121846.3, dated Nov. 2012, 6 pages.
Canadian Property Office, "Examination Report", in application No. 2,716,005 dated Feb. 25, 2013, 3 pages.
Canadian Current Claims in application No. 2,716,005 dated Mar. 2013, 4 pages.
State Intellectual Property Office of the People's Republic of China, "The Fourth Office Action", in application No. 200880121846.3, dated Feb. 17, 2013, 8 pages.
Current Chinese Claims, in application No. 200880121846.3, dated Feb. 2013, 6 pages.
Intellectual Property Office of Singapore, "Search Report" in application No. 201204608-2, dated May 30, 2013, 9 pages.
Current Claims in application No. 201204608-2, dated May 2013, 6, pages.
Current Claims in Korean application No. 10-2010-7016801, dated Feb. 2012, 3 pages.
Current Claims in Korean Application No. 201006571-2, dated Apr. 2011, 4 pages.
Australian Patent Office, "Office Action" Application No. 2009257992, dated May 12, 2011, 4 pages.
Current Claims in Taiwan Application No. 97141811, dated Apr. 2012, 4 pages.
Australian Patent Office, "Office Action" Application No. 2008345200 dated Aug. 16, 2011, 2 pages.
Australian Current Claims in Application No. 2008345200 dated Aug. 2011, 3 pages.
Current Claims in Chinese Application No. 200980110431.0, dated May 2012, 3 pages.

\* cited by examiner

| IP Address | Colocation A | Colocation B | Colocation C |
|---|---|---|---|
| 1.1.1.0 | 10 ms | 20 ms | 40 ms |
| 2.2.2.0 | 50 ms | 80 ms | 30 ms |
| 5.5.5.0 | 30 ms | 50 ms | 35 ms |

DNS WILDCARD BEACONING

PRIORITY CLAIM

This application claims the benefit as a Continuation of application Ser. No. 11/962,051, filed Dec. 20, 2007, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to tracking network clients in a network with domain name service capabilities.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As used herein, the term "data center" refers to a colocation of associated servers. The servers that belong to a particular data center are within the same building or complex but data centers are typically located geographically distant from each other. The geographic distance adds protection so that catastrophic failure in one data center caused by a natural disaster would not also cause failure in the other data center. For example, one data center might be located on the East Coast in New York and another data center might be located on the West Coast in San Francisco.

Global load balancing or "GLB," is a mechanism for distributing client access to particular services across a plurality of servers. For example, in a situation in which a particular service is provided by servers that belong to data centers in New York and San Francisco, GLB might distribute client access so that the number of clients connected to the data center in New York is about the same as the number of clients connected to the data center in San Francisco.

When used in the context of the Internet, GLB may use a variety of active and passive monitoring techniques to generate a complex map of the Internet. Based upon this map, GLB makes traffic routing decisions to connect a client to the "closest" server. As used herein, "close" does not necessarily mean basing the determination only on geographic proximity. As used herein, a "close" server is a server that results in the fastest connection to the client. Thus, if a server that was located 100 miles away were slower for the client to reach than a server located 200 miles away because of heavy congestion, then GLB would route the client to the "closer" server that is 200 miles away.

If a user wishes to connect to a web application or a web page, a DNS request is made. A DNS request begins with a user making a request through a client machine, often by typing a domain (e.g. "www.sampledomain.com") in a web browser. The request is sent from the client to a service provider's local DNS resolver ("LDNS"). An LDNS resolver accepts the request from the client and responds to the request with the domain's IP address if the LDNS resolver has stored the answer to the request in a cache. If the LDNS does not have the answer stored, the LDNS forwards the request to an authoritative DNS resolver. An authoritative DNS resolver is a server that maintains data for the network of a domain. The authoritative DNS resolver receives requests from a LDNS resolver and replies to the LDNS resolver with an IP address of a particular server to connect with the domain. As used herein, GLB resolvers may be a part of an authoritative DNS resolver. GLB resolvers may also be separate or located remotely from an authoritative name server. This may vary from implementation to implementation.

Unfortunately, GLB decisions may be based upon insufficient data. For example, if a request is made from the LDNS resolver to the GLB, the request contains information only about the LDNS and not the client that originated the request. Thus, the GLB is forced to make a decision based upon the location and congestion at the LDNS resolver rather than at the client.

Basing routing information on the LDNS resolver and not the client may cause two major problems. First, the client may be located very differently, by geography and network, than the LDNS resolver. This often leads to incorrect proximity mapping by the GLB. Second, because the LDNS resolver caches replies, the GLB is unable to determine the quantity of requests that are being generated by clients sitting behind the LDNS resolver. A single user performing a DNS lookup and one million different users may generate the same amount of traffic at the GLB. This makes load balancing determinations very inaccurate.

Figure 1:
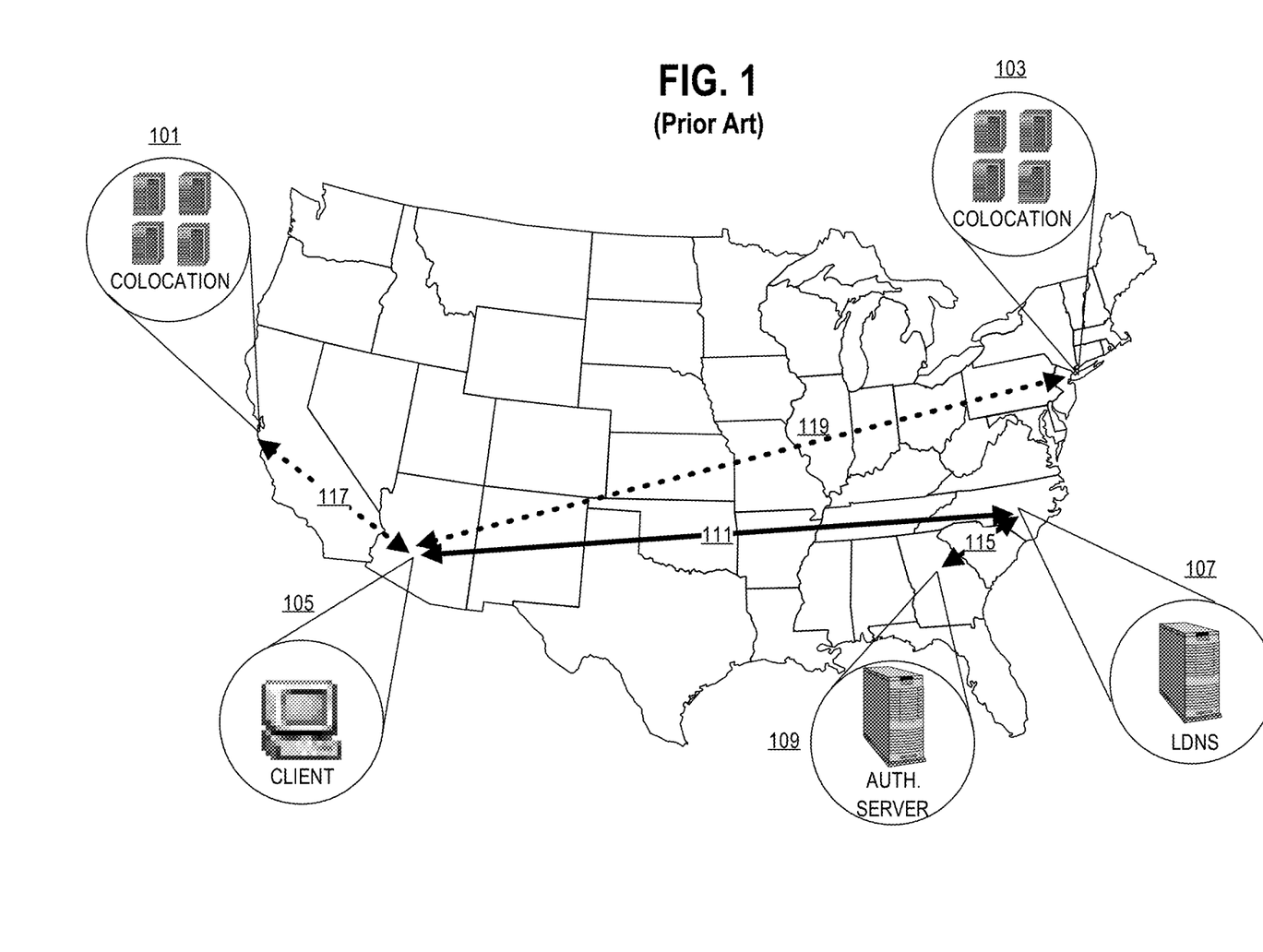
FIG. 1 is a diagram displaying a client connecting to a web application via DNS-based GLB to servers in different data centers.

An example of GLB based upon DNS is illustrated in FIG. 1. In FIG. 1, two data centers, or colocations, are located in geographically distinct areas. One data center is located in New York 103 and the other data center is located in San Francisco 101. The data center in New York 103 has an IP address 1.2.3.4 and the data center in San Francisco 101 has an IP address of 2.2.2.2.

A client 105 wishes to connect to the web page, "www.sampleconnection.com," hosted by the two data centers. The client 105, which uses ACME internet service provider, makes a request to connect to the domain. The request from the client 105 is sent 111 first to the ACME LDNS resolver 107. Based upon the request, the LDNS may have the answer stored in cache or forward the request to the domain's authoritative server that provides the IP address of the domain.

The ACME LDNS resolver 107 checks whether the IP address of the domain is stored in the LDNS resolver's cache. If the IP address is stored in the cache, then the stored IP address is sent to the client in response to the request. If the IP address to the domain is not found in the cache, then the LDNS resolver sends a request to the authoritative DNS resolver for the domain "www.sampleconnection.com" to obtain an IP address. This is shown in the request 115 made to the GLB and authoritative DNS resolver 109 for the domain "www.sampleconnection.com."

The GLB (with the authoritative DNS resolver) 109 then determines, based upon the request for the web page, whether to return the IP address of 1.2.3.4 for New York or 2.2.2.2 for San Francisco. Logic in the GLB analyzes the request including the location where the request originated, and the availability and load of the servers to determine which particular server is best for a particular client.

Unfortunately, the authoritative DNS server 109 views the request as originating from the location of the ACME LDNS resolver 107 in North Carolina, and not from the location of the client 105 in Arizona. Based upon the information from the LDNS resolver 107, the authoritative DNS server 109 might select a connection server based upon a request from North Carolina and the much geographically longer path to New York 119 might be selected rather than the shorter path from the client 105 to San Francisco 117.

The authoritative DNS resolver 109 is also unable to determine the number of clients that may reside behind a LDNS resolver. A single request to the authoritative DNS resolver may actually be for many clients behind the LDNS resolver. For example, the ACME LDNS 107 might make a single request for client 105 for the domain. After the first request, the ACME LDNS 107 stores the IP address of the domain in cache. One second later, ten thousand more requests are made for the same domain. Because the IP address is stored in the LDNS resolver's cache, the IP address is automatically returned to the clients and no additional requests are sent to the authoritative DNS server, for a period of time specified by the Time To Live setting in the response. Thus, should a server become overloaded or fail and the authoritative DNS server and GLB 109 must transfer clients from the overloaded or failed server to a healthy server, the authoritative DNS server 109 is unable to determine the number of clients sitting behind the LDNS resolver 107 and proper load balancing may not be maintained.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described to determine the number and location of clients that are residing behind an LDNS resolver and to use that information in traffic routing decisions. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, DNS wildcard beaconing is used in order to generate data to determine the number and location of clients that reside behind particular LDNS resolvers. The data is then used to estimate the load that is being generated by a particular LDNS resolver and where the particular LDNS resolver's clients are located in the network. This information allows the GLB server to make more educated and accurate routing decisions.

DNS Wildcard Beaconing

In an embodiment, a DNS wildcard beacon is initiated from an existing web application. As used herein, web beacons are also known as pixel tags, clear GIFs, or zero-content images and are transparent or invisible graphic images, usually no larger than a 1×1 pixel. In an embodiment, a web beacon is generated by placing a small amount of code, or beacon code, into production web pages. Clients request and are served the production web page from a web server in a data center. When the production web page is processed by the client, the beacon code causes the client browser to retrieve web beacons from beacon servers specified in the beacon code. The requests are performed in the background of the client so no interference occurs with the current web page load from the web server.

In an embodiment, a globally unique wildcard hostname is generated for a web beacon download and that beacon URL is embedded in an existing web result and sent to the client which proceeds to download that image. In another embodiment, a globally unique wildcard hostname is generated for a HTTP 204 (i.e., "no content") download and placed in a web result. For example, the following globally unique wildcard hostname might be generated:

"http://12093898978.dnsb.company.com/onepixel.gif"

The globally unique wildcard hostname comprises (1) a unique alphanumerical sequence ("12093898978"), (2) a domain name ("*.dnsb.company.com"), and (3) a name of the web beacon object to be retrieved ("onepixel.gif").

When a client begins the process to download the beacon image, the client must first resolve the unique hostname into an IP address. The client sends a request to the client's LDNS resolver. The LDNS resolver examines the LDNS resolver's cache to determine whether an IP address is available for the hostname requested in the request. If the IP address is available, the LDNS resolver would respond to the request with an IP address of the hostname. However, since the hostnames for the web beacons are globally unique, the IP address should not be available in the LDNS resolver's cache.

Because the IP address of the hostname is unavailable from the cache, the LDNS resolver sends a request to the authoritative DNS resolver. In an embodiment, the authoritative DNS resolver is also a beacon resolver for the domain requested (in this case, "dnsb.company.com"). As used herein, a "beacon resolver" is a server that measures and logs statistics based upon the requests received at the authoritative DNS resolver. The beacon resolver also returns an IP address to which the client may retrieve the web beacon.

In an embodiment, the authoritative DNS resolvers/beacon resolvers are configured to respond to requests for the domain ("*.dnsb.company.com") with the IP address of a beacon collection server. As this is performed, the beacon resolvers log the unique wildcard hostname (e.g., "12093898978.dnsb.company.com") and LDNS resolvers' IP addresses for all such requests. In another embodiment, the beacon resolver records the unique alphanumeric sequence ("12093898978") located within the hostname and the LDNS resolver's IP address. The LDNS resolver/beacon resolver then sends the IP address of the beacon collection server to the client.

The client then submits a request to the beacon collection server for the requested URL, with the request including the globally unique hostname. The request by the client may be any Transmission Control Protocol ("TCP")-based protocol, including, but not limited to, HTTP, FTP, or any other communications protocol that is based on TCP. In an embodiment, the client submits an HTTP request to the beacon collection server for the requested URL, inserting the same globally unique hostname (i.e., "12093898978. dnsb.company.com") in the HTTP host header. The beacon collection server receives the HTTP request from the client. The beacon collection server logs the unique wildcard hostname and the IP address of the client. In another embodiment, the beacon collection server logs the unique alphanumeric sequence in the hostname and the IP address of the client. The beacon server responds to the request by sending a single pixel, zero-content image, or HTTP 204 to the client, depending upon the nature of the request. Additional connection quality statistics may be logged and measured by a kernel module within the beacon resolver.

Figure 2:
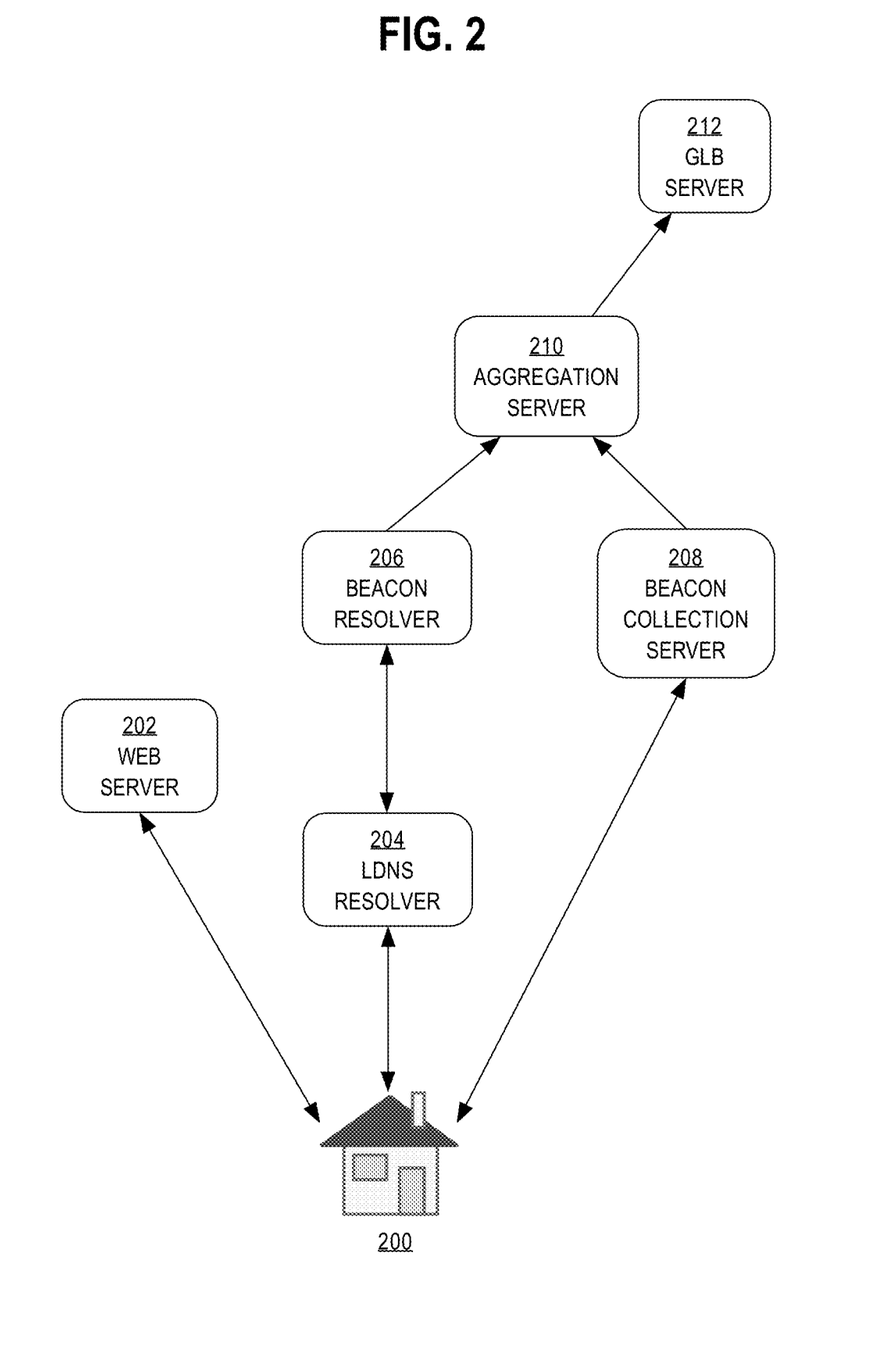
FIG. 2 is a diagram displaying how an aggregation server maps IP addresses of a client to the IP address of an LDNS resolver based upon web beacons, according to an embodiment of the invention.

A diagram illustrating web beacons and how web beacons are used to map clients to a particular LDNS resolver, according to an embodiment, is shown in FIG. 2. The process begins when client 200 requests a web page and is served the web page from web server 202. Within the web page is beacon code, that instructs client 200 to retrieve a web beacon, or a zero-content image, from a location specified in the beacon code. When the web page is processed by the client 200, retrieval of the web beacon begins.

A globally unique hostname (e.g., "12345.dnsb.company.com") is used as the location of the web beacon. Client 200 sends the request for the web beacon to LDNS resolver 204, that is owned by the ISP of client 200, in order to resolve the hostname into an IP address. LDNS resolver first checks if the IP address is available within the LDNS cache. As the hostname is unique, the LDNS resolver forwards the request to the authoritative DNS resolver for the hostname. The authoritative DNS resolver is also the beacon resolver 206 for the hostname (i.e., "*.dnsb.company.com"). The beacon resolver 206 logs the IP address of the LDNS resolver 204 and the unique wildcard of the hostname (i.e., "12345"). The beacon resolver 206 then returns to the LDNS resolver 204 the IP address of the beacon collection server 208 where the client may request the web beacon. The LDNS resolver 204 forwards the IP address of the beacon collection server 208 to client 200. Client 200 then sends the HTTP request ("12345.dnsb.company.com") to the beacon collection server 208. The beacon collection server 208 receives the request from the client and logs the IP address of client 200 and the unique wildcard of the hostname (i.e., "12345"). The beacon collection server 208 responds to the client 200 with a zero-content image or an HTTP 204 (no download) status.

Aggregating and Processing Data

In an embodiment, an aggregation server collects data from the beacon resolver and the beacon collection server. The data from the beacon resolver contains a globally unique hostname and the IP address of an LDNS. The data from the beacon collection server contains a globally unique hostname and the IP address of a client. Using the globally unique hostname as a key, the aggregation server may map the IP addresses of clients to the IP address of a particular LDNS. Thus, by aggregating data over time, the number and IP addresses of clients that reside behind a particular LDNS may be determined. The proximity of a client may also be determined within a network based upon the IP addresses stored for the clients. This data may then be exported from the aggregation server to GLB servers in order to perform more accurate routing.

An illustration of this process may be seen in FIG. 2. In FIG. 2, beacon resolver 206 has logged the IP address of the LDNS resolver 204 and the unique sequence in the hostname ("12345") from the request. Beacon collection server has logged the IP address of client 200 and the unique sequence in the hostname ("12345") from the request. Aggregation server 210 collects the logged data from beacon resolver 206 and beacon collection server 208. At the aggregation server 210, the IP address of client 200 is mapped to the IP address of the LDNS resolver 204 using the unique hostname sequence as a key. Thus, in the example, LDNS resolver 204 is associated with unique hostname "12345" and client 200 is associated with unique hostname "12345." Because the hostname ("12345") matches, the IP address of client 200 is mapped to the IP address of LDNS resolver 204. The information that client 200 resides behind LDNS resolver 204 is sent from the aggregation server 210 to the GLB server 212 in order for the GLB server to better route subsequent requests based upon client proximity and load.

In an embodiment, load on a particular LDNS is accurately determined by finding the number of client IP addresses associated with a given LDNS resolver. For example, aggregated data may show that one particular LDNS resolver is associated with twenty different client IP addresses while another particular LDNS resolver is associated with fifty thousand different client IP addresses. This technique allows accurate determinations of load from an LDNS resolver rather than being forced to make assumptions about the load based on the type and breadth of requests seen from an LDNS resolver.

In an embodiment, client proximity mapping is improved by analyzing the IP addresses of the clients behind a particular LDNS resolver. Based upon the IP addresses of clients, an approximation of a client's location, geographically and within a network, may be determined. Thus, upon receiving a request from a LDNS resolver, a GLB may base routing decisions upon the locations of clients and not the location of the LDNS. The improvement in routing is greatest when the LDNS resolver is located distantly from the location of the LDNS resolver's associated clients.

Load Balancing Server Using Aggregation Server Data

An example follows of how a global load balancer may use the data from the aggregation server. Global load balancing is performed when a client requests to visit a particular web page. A DNS lookup is performed to translate the website URL entered by the client (e.g. "www.yahoo.com") into an IP address (e.g. "209.131.36.158"). The lookup is directed first to the LDNS resolver, and if the LDNS resolver does not possess the information, to an authoritative name server (that is also a load balancing server). The load balancing server examines the requesting IP address of the LDNS resolver. The requesting IP address is then compared to the information for that particular netblock, or range of IP addresses. The load balancing server selects the first available web server on the list sorted by various statistics such as proximity and load and returns the IP address of the web server to the LDNS resolver. By having additional information about clients behind the LDNS resolver, the load balancing server better routes the original client to the web server with the best connectivity.

Figure 3:
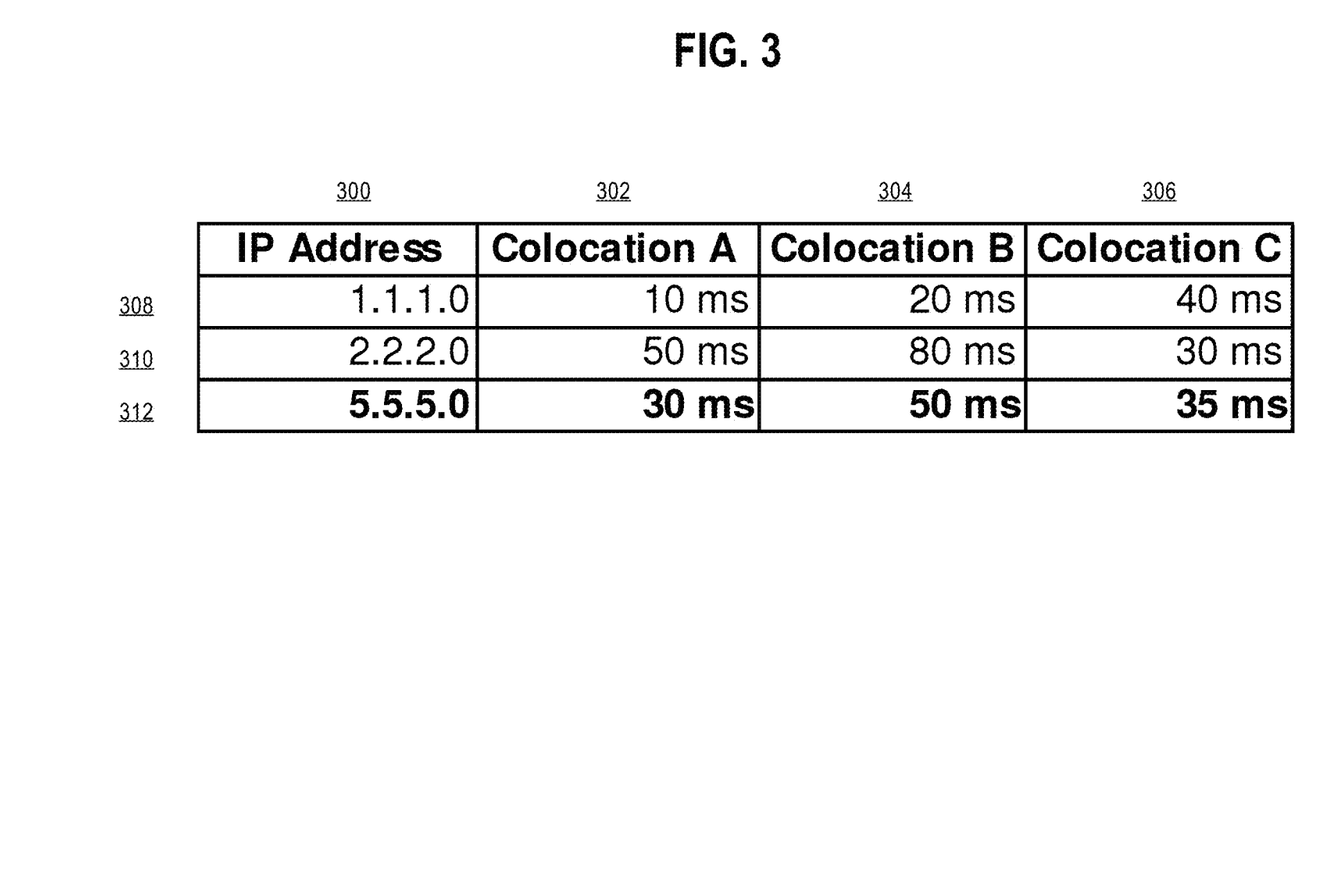
FIG. 3 is a diagram displaying connection time calculation tables based upon IP addresses of clients and particular colocations, according to an embodiment of the invention.

An illustration of how data from the aggregation server is used, according to an embodiment of the invention, is shown in FIG. 3. The data has "IP Address" column 300, "Colocation A" column 302, "Colocation B" column 304, and "Colocation C" column 306. "IP Address" column 300 lists the IP addresses to which each of the colocations connect. In row 308, the IP Address "1.1.1.0" indicates that machines at the IP address "1.1.1.x" where x can be any number between 0-255 may connect to colocation A in 10 ms, to colocation B in 20 ms, and to colocation C in 40 ms.

In row 310, the IP Address "2.2.2.0" indicates that machines at the IP address "2.2.2.x" where x can be any number between 0-255 may connect to colocation A in 50 ms, to colocation B in 80 ms, and to colocation C in 30 ms.

The data from the aggregation server might indicate that a LDNS resolver with the IP address "5.5.5.5" comprises clients, half with IP addresses "1.1.1.x" and the other half with IP addresses "2.2.2.x." Under this circumstance, the connection times to the three different colocation centers may be determined by finding the average of the connection times.

For example, row 312 displays the IP address "5.5.5.0." This row would indicate the connection times for the LDNS resolver. Thus the connection time to colocation A from the LDNS resolver is 30 ms, the average of 10 ms (from "1.1.1.0") and 50 ms (from "2.2.2.0"). The connection time to colocation B from the LDNS resolver is 50 ms, the average of 20 ms (from "1.1.1.0") and 80 ms (from "2.2.2.0"). The connection time to colocation C from the LDNS resolver is 35 ms, the average of 40 ms (from "1.1.1.0") and 30 ms (from "2.2.2.0"). Though the connection times from the LDNS resolver to each colocation center is not exact, by taking into account connection times of clients based upon IP addresses, an accurate estimation may be made.

Hardware Overview

Figure 4:
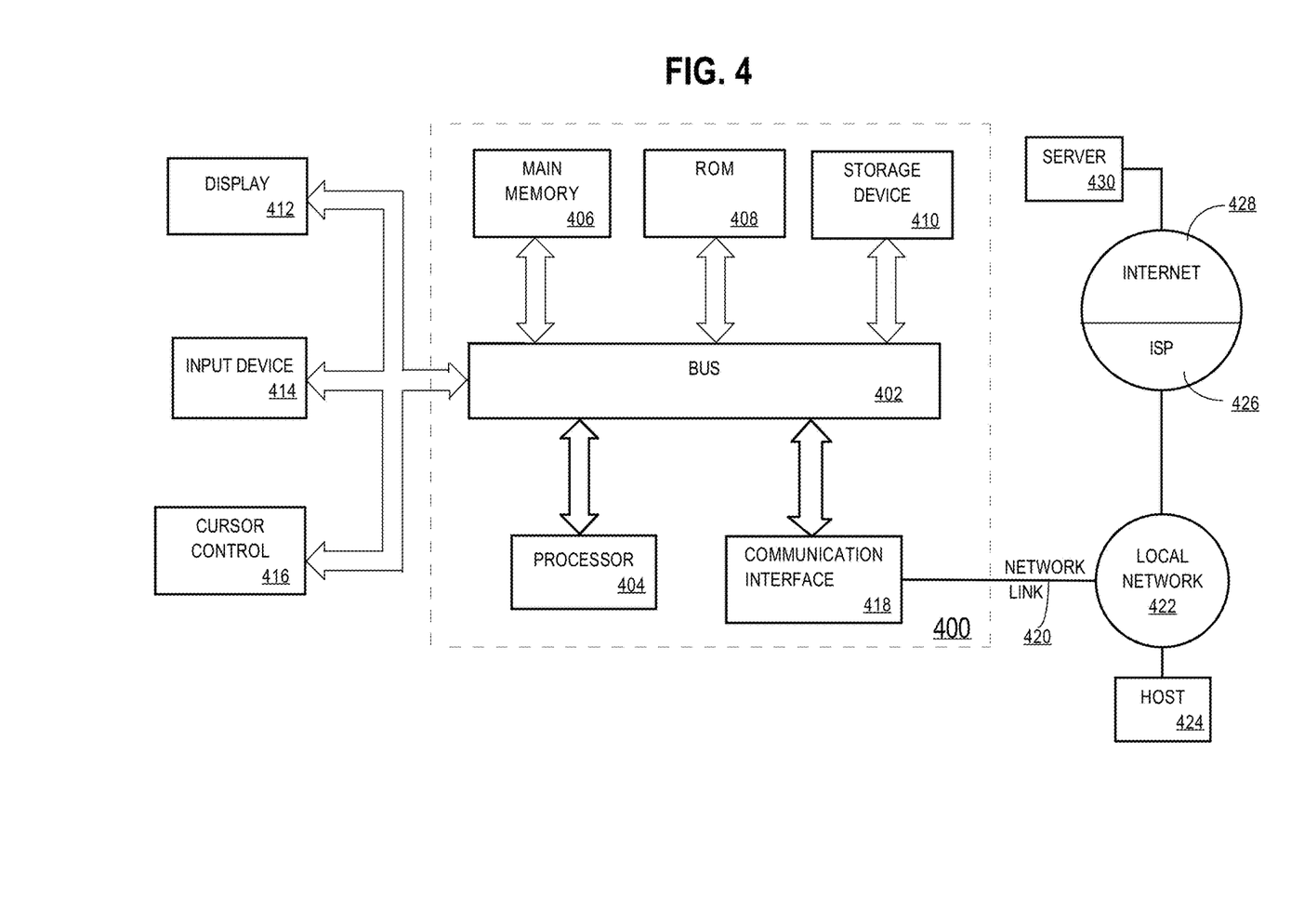
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
   receiving a network request from a resolver to resolve a hostname, the network request from the resolver comprising a network address of the resolver, the hostname comprising a unique wildcard portion that makes the hostname unresolvable by the resolver;
   in response to receiving the network request from the resolver to resolve a hostname, wherein the network address from the resolver comprises the network address of the resolver, storing first information representing an association between at least the unique wildcard portion of the hostname that makes the hostname unresolvable by the resolver and the network address of the resolver;
   receiving a network request from a client for a resource, the network request from the client for a resource comprising a network address of the client and at least the unique wildcard portion of the hostname that makes the hostname unresolvable by the resolver;
   storing second information representing an association between at least the unique wildcard portion of the hostname that makes the hostname unresolvable by the resolver and the network address of the client;
   associating the client with the resolver based on the first information representing an association between at least the unique wildcard portion of the hostname that makes the hostname unresolvable by the resolver and the network address of the resolver and the second information representing an association between at least the unique wildcard portion of the hostname that makes the hostname unresolvable by the resolver and the network address of the client; and
   storing third information representing the association between the client and the resolver;
   using the third information to route subsequent requests to resolve hostnames to resolvers; and
   wherein the method is performed by one or more computing devices.

2. The method of claim 1, further comprising sending the unique wildcard portion of the hostname that makes the hostname unresolvable by the resolver to the client prior to receiving the network request from the client for the resource.

3. The method of claim 1, wherein the network request from the resolver to resolve a hostname is a domain name resolution request.

4. The method of claim 1, wherein the unique wildcard portion of the hostname that makes the hostname unresolvable by the resolver is an alphanumeric character sequence.

5. The method of claim 1, wherein the resource is a web beacon.

6. The method of claim 1, wherein the resource is a one pixel digital image.

7. The method of claim 1, wherein the third information comprises the network address of the client and the network address of the resolver.

8. The method of claim 1, further comprising:
   determining a geographic location associated with the network address of the client;
   based at least in part on the third information representing the association between the client and the resolver and on the geographic location associated with the network address of the client, associating, with the resolver, the geographic location associated with the network address of the client;
   receiving another network request from the resolver to resolve another hostname;
   selecting one of a set of available network addresses to resolve the other hostname to based at least in part on the geographic location associated with the network address of the client that was associated with the resolver.

9. A method comprising:
   receiving a plurality of domain name resolution requests from a plurality of resolvers, each of the domain name resolution requests comprising a network address of the resolver that sent the domain name resolution request and a hostname to resolve comprising a unique wildcard portion that makes the hostname unresolvable by the resolver;
storing first information representing associations between at least the unique wildcard portions of the hostname that makes the hostname unresolvable by the resolver in the plurality of domain name resolution requests and the network addresses of the plurality of resolvers;
receiving a plurality of resource requests from a plurality of clients, each of the resource requests comprising a network address of the client that sent the resource request and at least the unique wildcard portion of the hostname that makes the hostname unresolvable by the resolver received in one of the plurality of domain name resolution requests;
storing second information representing associations between at least the unique wildcard portions of the hostname that makes the hostname unresolvable by the resolver in the plurality of resource requests and the network addresses of the plurality of clients; and
associating each of the plurality of clients with one of the plurality of resolvers based on the first information representing associations between at least the unique wildcard portions of the hostname that makes the hostname unresolvable by the resolver in the plurality of domain name resolution requests and the network addresses of the plurality of resolvers and the second information representing associations between at least the unique wildcard portions of the hostname that makes the hostname unresolvable by the resolver in the plurality of resource requests and the network addresses of the plurality of clients;
storing third information representing the associations between the plurality of clients and the plurality of resolvers; and
using the third information to route subsequent requests to resolve hostnames to resolvers; and
wherein the method is performed by one or more computing devices.

10. The method of claim 9, further comprising sending, to each client of the plurality of clients, the unique wildcard portion of the hostname that makes the hostname unresolvable by the resolver received in the resource request from the client prior to receiving the resource request from the client.

11. The method of claim 9, further comprising:
based on the third information, determining, for each resolver of the plurality of resolvers, a number of the clients of the plurality of clients that, according to the third information, are associated with the resolver.

12. The method of claim 9, wherein the third information comprises the network address of the plurality of resolvers associated with the network address of the plurality of clients.

13. The method of claim 9, further comprising:
based on the third information, determining, for each resolver of the plurality of resolvers, a geographic location of the clients of the plurality of clients that, according to the third information, are associated with the resolver.

14. The method of claim 9, further comprising:
determining a set of one or more network address ranges based on the network addresses of the clients of the plurality of clients that, according to the third information, are associated with a particular resolver of the plurality of resolvers;
determining a network performance measurement for each network address range in the set of network address ranges;
receiving a network request from the particular resolver to resolve a particular hostname;
selecting one of a set of available network addresses to resolve the particular hostname to based at least in part on the network performance measurements determined for the set of network address ranges.

15. One or more non-transitory computer-readable media storing instructions which, when executed by one or more computing devices, cause the one or more computing devices to perform a method comprising:
receiving a network request from a resolver to resolve a hostname, the network request from the resolver comprising a network address of the resolver, the hostname comprising a unique wildcard portion that makes the hostname unresolvable by the resolver;
storing first information representing an association between at least the unique wildcard portion of the hostname that makes the hostname unresolvable by the resolver and the network address of the resolver;
receiving a network request from a client for a resource, the network request from the client for a resource comprising a network address of the client and at least the unique wildcard portion of the hostname that makes the hostname unresolvable by the resolver;
storing second information representing an association between at least the unique wildcard portion of the hostname that makes the hostname unresolvable by the resolver and the network address of the client;
associating the client with the resolver based on the first information representing an association between at least the unique wildcard portion of the hostname that makes the hostname unresolvable by the resolver and the network address of the resolver and the second information representing an association between at least the unique wildcard portion of the hostname that makes the hostname unresolvable by the resolver and the network address of the client;
storing third information representing the association between the client and the resolver; and
using the third information to route subsequent requests to resolve hostnames to resolvers.

16. The one or more non-transitory computer-readable media of claim 15, further comprising additional instructions which, when processed by the one or more computing devices, causes sending the unique wildcard portion of the hostname that makes the hostname unresolvable by the resolver to the client prior to receiving the network request from the client for the resource.

17. The one or more non-transitory computer-readable media of claim 15, wherein the network request from the resolver to resolve a hostname is a domain name resolution request.

18. The one or more non-transitory computer-readable media of claim 15, wherein the unique wildcard portion of the hostname that makes the hostname unresolvable by the resolver is an alphanumeric character sequence.

19. The one or more non-transitory computer-readable media of claim 15, wherein the resource is a web beacon.

20. The one or more non-transitory computer-readable media of claim 15, wherein the resource is a one pixel digital image.

21. The one or more non-transitory computer-readable media of claim 15, wherein the third information comprises the network address of the client and the network address of the resolver.

22. The one or more non-transitory computer-readable media of claim 15, further comprising additional instructions which, when processed by the one or more computing devices, causes:
   determining a geographic location associated with the network address of the client;
   based at least in part on the third information representing the association between the client and the resolver and on the geographic location associated with the network address of the client, associating, with the resolver, the geographic location associated with the network address of the client;
   receiving another network request from the resolver to resolve another hostname;
   selecting one of a set of available network addresses to resolve the other hostname to based at least in part on the geographic location associated with the network address of the client that was associated with the resolver.

23. One or more non-transitory computer-readable media storing instructions which, when executed by one or more computing devices, cause the one or more computing devices to perform a method comprising:
   receiving a plurality of domain name resolution requests from a plurality of resolvers, each of the domain name resolution requests comprising a network address of the resolver that sent the domain name resolution request and a hostname to resolve comprising a unique wildcard portion that makes the hostname unresolvable by the resolver;
   storing first information representing associations between at least the unique wildcard portions of the hostname that makes the hostname unresolvable by the resolver in the plurality of domain name resolution requests and the network addresses of the plurality of resolvers;
   receiving a plurality of resource requests from a plurality of clients, each of the resource requests comprising a network address of the client that sent the resource request and at least the unique wildcard portion of the hostname that makes the hostname unresolvable by the resolver received in one of the plurality of domain name resolution requests;
   storing second information representing associations between at least the unique wildcard portions of the hostname that makes the hostname unresolvable by the resolver in the plurality of resource requests and the network addresses of the plurality of clients; and
   associating each of the plurality of clients with one of the plurality of resolvers based on the first information representing associations between at least the unique wildcard portions of the hostname that makes the hostname unresolvable by the resolver in the plurality of domain name resolution requests and the network addresses of the plurality of resolvers and the second information representing associations between at least the unique wildcard portions of the hostname that makes the hostname unresolvable by the resolver in the plurality of resource requests and the network addresses of the plurality of clients;
   storing third information representing the associations between the plurality of clients and the plurality of resolvers; and
   using the third information to route subsequent requests to resolve hostnames to resolvers.

24. The one or more non-transitory computer-readable media of claim 23, further comprising sending, to each client of the plurality of clients, the unique wildcard portion of the hostname received in the resource request from the client prior to receiving the resource request from the client.

25. The one or more non-transitory computer-readable media of claim 23, further comprising:
   based on the third information, determining, for each resolver of the plurality of resolvers, a number of the clients of the plurality of clients that, according to the third information, are associated with the resolver.

26. The one or more non-transitory computer-readable media of claim 23, wherein the third information comprises the network address of the plurality of resolvers associated with the network address of the plurality of clients.

27. The one or more non-transitory computer-readable media of claim 23, further comprising:
   based on the third information, determining, for each resolver of the plurality of resolvers, a geographic location of the clients of the plurality of clients that, according to the third information, are associated with the resolver.

28. The one or more non-transitory computer-readable media of claim 23, further comprising:
   determining a set of one or more network address ranges based on the network addresses of the clients of the plurality of clients that, according to the third information, are associated with a particular resolver of the plurality of resolvers;
   determining a network performance measurement for each network address range in the set of network address ranges;
   receiving a network request from the particular resolver to resolve a particular hostname;
   selecting one of a set of available network addresses to resolve the particular hostname to, based at least in part on the network performance measurements determined for the set of network address ranges.

29. A system comprising:
   one or more processors and memory;
   an authoritative domain name resolver module configured to receive a network request from a resolver to resolve a hostname, the network request from the resolver comprising a network address of the resolver, the hostname comprising a unique alphanumeric sequence that makes the hostname unresolvable by the resolver;
   the authoritative domain name resolver module further configured to store first information representing an association between at least the unique alphanumeric sequence that makes the hostname unresolvable by the resolver and the network address of the resolver, in response to receiving the network request from the resolver;
   a web server module configured to serve a first resource to a client, the first resource comprising at least the unique alphanumeric sequence;
   the web server module further configured to receive a network request from the client for a second resource, the network request from the client comprising a network address of the client and at least the unique alphanumeric sequence that makes the hostname unresolvable by the resolver served to the client as part of the first resource;

the web server module further configured to serve the second resource to the client in response to receiving the network request from the client;

the web server module further configured to store second information representing an association between at least the unique alphanumeric sequence that makes the hostname unresolvable by the resolver and the network address of the client, in response to receiving the network request from the client;

an aggregation server module configured to associate the client with the resolver, based on the first information representing an association between at least the unique alphanumeric sequence that makes the hostname unresolvable by the resolver and the network address of the resolver and the second information representing an association between at least the unique alphanumeric sequence that makes the hostname unresolvable by the resolver and the network address of the client; and the aggregation server module further configured to store third information representing the association between the client and the resolver;

a load balancing server module further configured to select, based on the third information representing the association between the client and the resolver or information derived from the third information representing the association between the client and the resolver, network addresses to resolves hostnames to, in response to receiving requests to resolve the hostnames from the resolver.

* * * * *